United States Patent [19]
Paul et al.

[11] Patent Number: 6,086,243
[45] Date of Patent: Jul. 11, 2000

[54] ELECTROKINETIC MICRO-FLUID MIXER

[75] Inventors: Phillip H. Paul, Livermore; David J. Rakestraw, Fremont, both of Calif.

[73] Assignee: Sandia Corporation, Albuquerque, N. Mex.

[21] Appl. No.: 09/164,863

[22] Filed: Oct. 1, 1998

[51] Int. Cl.$^7$ .................................................. B01F 13/08
[52] U.S. Cl. ...................... 366/273; 366/173.1; 366/348; 366/349; 204/450
[58] Field of Search .................................. 366/273, 336, 366/340, 274, 173.1, 167.1, 349, 341, 348; 204/451, 453, 454, 450

[56] References Cited

U.S. PATENT DOCUMENTS

| | | | |
|---|---|---|---|
| 4,175,871 | 11/1979 | Suh et al. | 366/79 |
| 4,684,254 | 8/1987 | Goudy, Jr. | 366/340 |
| 4,908,112 | 3/1990 | Pace | 204/601 |
| 5,429,734 | 7/1995 | Gajar et al. | 204/603 |
| 5,632,876 | 5/1997 | Zanzucchi et al. | 204/600 |
| 5,824,204 | 10/1998 | Jerman | 204/601 |
| 5,846,396 | 12/1998 | Zanzucchi et al. | 204/601 |

FOREIGN PATENT DOCUMENTS

| | | |
|---|---|---|
| 0727661 | 8/1996 | European Pat. Off. . |
| WO 96/04547 | 2/1996 | WIPO . |

*Primary Examiner*—Tony G. Soohoo
*Attorney, Agent, or Firm*—D. A. Nissen

[57] ABSTRACT

A method and apparatus for efficiently and rapidly mixing liquids in a system operating in the creeping flow regime such as would be encountered in capillary-based systems. By applying an electric field to each liquid, the present invention is capable of mixing together fluid streams in capillary-based systems, where mechanical or turbulent stirring cannot be used, to produce a homogeneous liquid.

7 Claims, 2 Drawing Sheets

6,086,243

ELECTROKINETIC MICRO-FLUID MIXER

STATEMENT OF GOVERNMENT INTEREST

This invention was made with Government support under contract no. DE-AC04-94AL85000 awarded by the U.S. Department of Energy to Sandia Corporation. The Government has certain rights in the invention.

CROSS-REFERENCE TO RELATED APPLICATIONS

Not applicable

BACKGROUND OF THE INVENTION

This invention relates to method and apparatus for uniformly mixing liquids in an environment wherein the velocity of liquid flow is defined by a Reynolds number less than 1.

The normal means of mixing two or more miscible liquids is to stir (either mechanically with a blade or by using fluid inertial forces) to produce a high rate of fluid flow that, in turn, produces large inertial forces within the liquid to create turbulence, which by its nature, provides a large interfacial surface area between the liquids such that diffusion of the liquids into each other can take place readily to produce a single homogeneous liquid. However, when the velocity of flow of the liquids is very small (creeping flow), i.e., the Reynolds number $R=Ud/v<1$, wherein U=mean flow velocity, d=the diameter of the flow channel, and v=the kinematic viscosity, such as might be encountered in capillary systems, fluid viscous forces completely dominate the fluid inertial forces produced by high rates of fluid flow owing to the small length scales and low velocities. In this case the inertial forces that produce turbulence and the resultant large interfacial surface areas necessary to promote mixing are absent. Thus, the only mixing that can occur in creeping flow is by diffusion through a limited interfacial area. Since, in general, in those systems in which creeping flow is the dominant mode of liquid flow, the ratio of interfacial surface area to volume is very small, mixing two liquids to produce a single homogeneous liquid can be a slow process requiring the two liquids to be in contact for extended periods of time. For many applications where two or more miscible liquids must be mixed and dispensed rapidly but which must operate in the creeping flow regime, such as generally the case in capillary systems, this is unacceptable. What is needed is a means for rapidly producing a single homogeneous liquid by mixing two or more liquids in a creeping flow regime.

An alternative method to create interface in a liquid in the low Reynolds number limit is to repeatedly: 1) divide the liquid into two or more flow streams, 2) physically rotate the flow streams about the flow axis, and 3) recombine the divided liquid. This can only be achieved by providing for flow out of the plane which requires a multilevel fluidic structure which, can be disadvantageous.

It has long been known that liquids, and particularly electrolytes, can be caused to flow by virtue of electroosmotic flow. Electroosmotic flow is attributable to the formation of an electric double layer at the interface between a solid that is a dielectric material and a liquid capable of charge separation, generally an electrolyte. As a consequence of the formation of the electric double layer, a electrically charged diffuse layer is formed in the liquid extending from the solid-liquid interface into the bulk of the liquid. Under the influence of a tangential electric field, produced by electrodes having an electric potential applied thereto, and, in contact with the liquid, the diffuse layer is caused to move. The liquid will now flow as a consequence of the force (electroosmotic force) developed between the moving liquid and the wall of the dielectric material. Furthermore, the liquid will flow at a constant rate depending upon the equilibrium established between frictional forces. Thus, in the low Reynolds number limit, an increase in the liquid interface can only be achieved through repeated laminar folding of the liquid, such as can be achieved by electroosmotic flow.

By taking advantage of electroosmotic flow it is possible to rapidly mix two or more miscible liquids together to form a homogeneous liquid without mechanical stirring.

SUMMARY OF THE INVENTION

The present invention provides method and apparatus for efficiently and rapidly mixing together liquids in a system operating in the creeping flow regime, i.e., the Reynolds number is less than 1. In particular, the present inventive apparatus pertains to mixing together two or more liquid streams in capillary-based systems, those systems in which the thickness of the system is small compared to its width and thus, by virtue of their size the normal modes of mixing, such as stirring, cannot be used.

In this invention, an electric field is applied to each liquid, thereby inducing electroosmotic flow in each, the liquids being in contact with one another. By appropriate choice of the value of the electric field each liquid can be induced to create a zone of recirculation thereby stirring the liquid and creating interfacial area to promote molecular mixing. The electroosmotically induced fluid flow causes repeated laminar folding of the liquids to homogeneously mix the liquids together.

The advantages of the inventive device over available technologies for mixing liquids together to produce a homogeneous liquid in a creeping flow, or low Reynolds number regime, are: 1) operation on a single level, thereby making for simpler fabrication; 2) the degree of mixing is externally adjustable through the applied voltage; and 3) operation in a flowing (continuous) or batch mode basis.

Thus, it is an object of this invention to provide a method for mixing liquids in a system operating in a creeping flow regime to produce a homogeneous liquid. It is a further object to provide a method of mixing liquids in a capillary system to produce a homogeneous liquid. Yet another object is to provide apparatus for mixing liquids in a creeping flow regime to produce a homogeneous liquid.

DETAILED DESCRIPTION OF THE INVENTION

Figure 1:
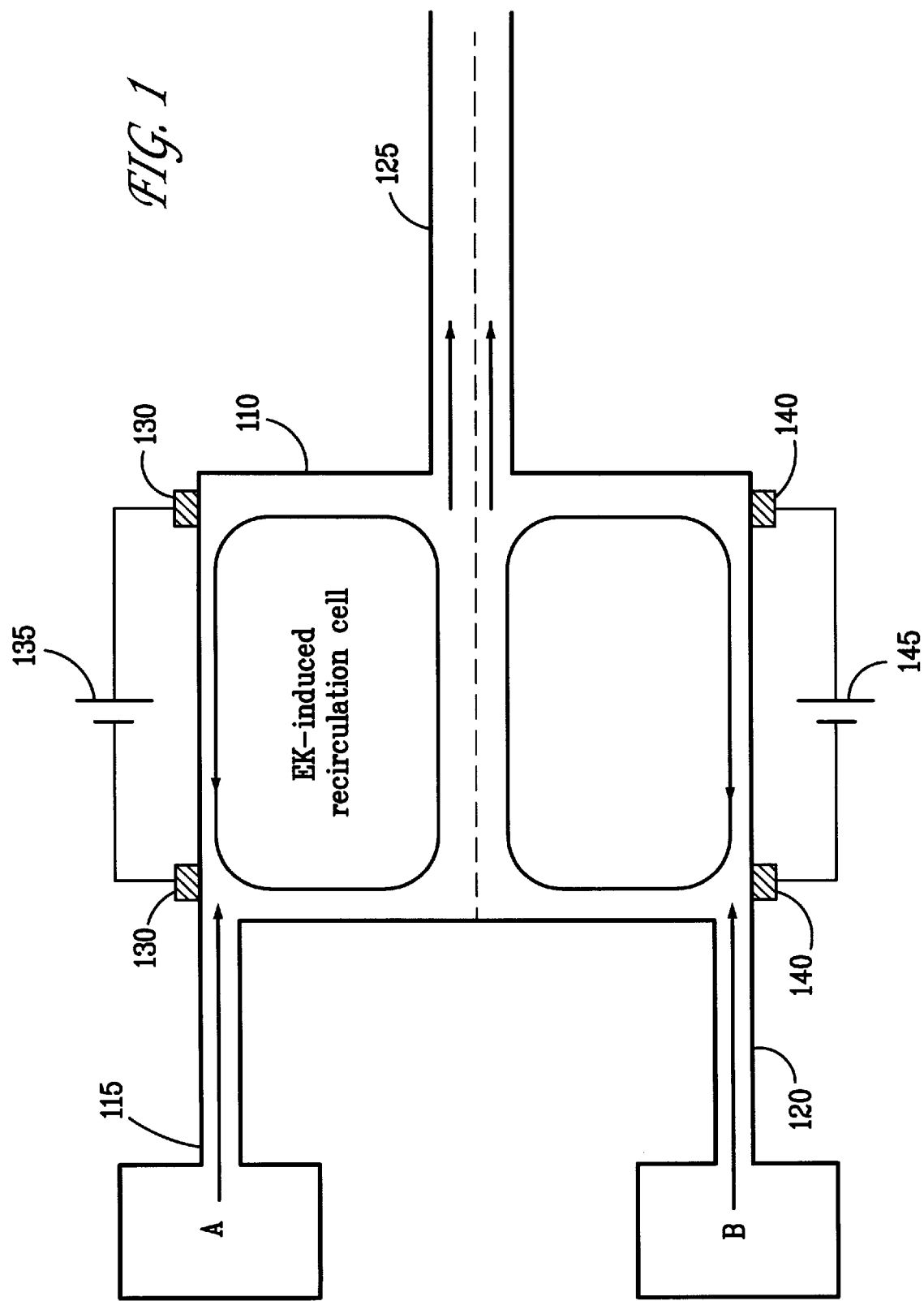
FIG. 1 illustrates an embodiment of the present invention.

The present invention can be characterized by reference to FIG. 1. A chamber 110 is provided with liquid inlets 115 and 120 which can lead from reservoirs A and B and serve to introduce liquids from the reservoirs into chamber 110 and a single fluid outlet 125 which receives the liquid output from chamber 110 and directs it elsewhere. Chamber 110 can be constructed from a dielectric material whose conductivity is less than that of the introduced liquids and will support electroosmotic flow, such as silica or alumina. The dielectric portion of chamber 110 is fitted with pairs of spaced electrodes, such as 130 and 140. Each pair of spaced electrodes is in contact with one liquid and is connected to a DC power supply (135 and 145), the magnitude of the velocity of flow of fluids in chamber 110 being controlled by the DC power supply.

As described above, an electric double layer is created in a liquid, and particularly an electrolyte, in contact with a dielectric material, such as comprise chamber 110. The presence of the applied electric field, such as that produced by the pairs of spaced electrodes 130 and 140, induces a force on the liquid double layer that causes motion of the liquids contained in chamber 110 along the chamber walls. In the absence of any net flow through the chamber the liquids are caused to recirculate within their respective portion of the chamber. The recirculation of the respective liquids produces repeated laminar folding that increases the interfacial area of each liquid such that diffusion of each liquid into the other takes place rapidly and leads to the formation of a homogeneous mixture. This process is termed electrokinetic mixing.

Figure 2:
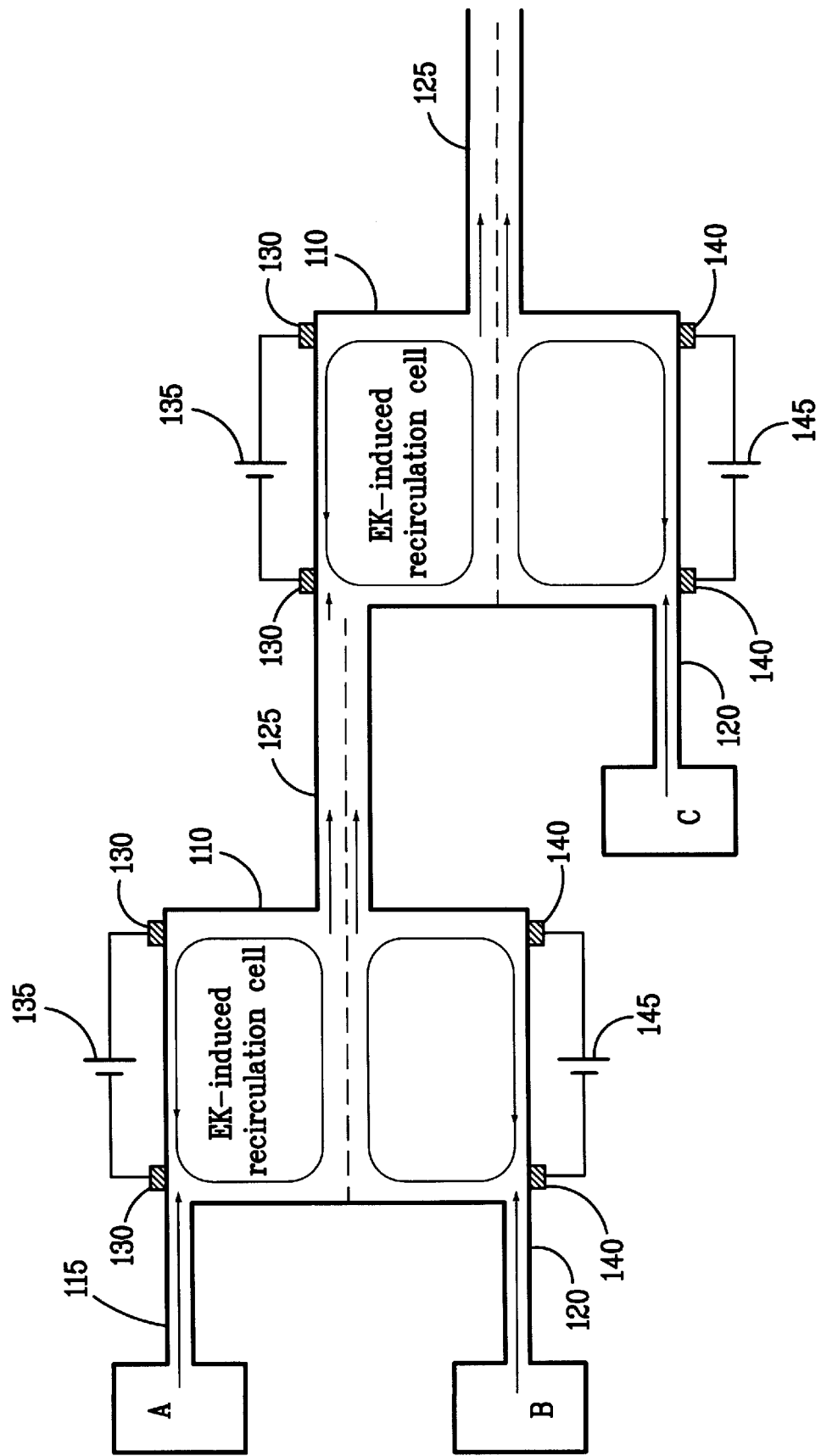
FIG. 2 illustrates a series configuration of the fluid mixer.

Many possible variations and configurations of the example set forth will occur to those skilled in the art. By way of example, the polarity and voltages on the electrodes can be varied such as a step function in time or oscillatory having a varying shape and period. Multiple chambers, such as that illustrated in FIG. 1, can be connected together in series (FIG. 2) or parallel arrangement. Operation of chamber 110 can be in batch mode—wherein the liquids are pumped into the chamber, the flow into the chamber stopped, the liquids mixed by the inventive method described herein, and a new batch of liquid pumped in pumping out the mixed batch of liquid; or continuous mode wherein the liquids are continuously pumped through the chamber and mixed as set forth herein as they pass through the chamber. Further, connecting chambers in series, such as shown in FIG. 2, provides for admixing additional components.

While it is generally envisioned that the lquids to be mixed are miscible, it is contemplated that the inventive method can be used to mix together immiscible liquids to form, by way of example, an emulsion. It will be appreciated that the liquids being mixed can have various solutes dissolved therein.

It will be understood that the above described arrangements of apparatus are merely illustrative of applications of the principles of this invention and many other embodiments and modifications may be made without departing from the spirit and scope of the invention as defined in the claims.

We claim:

1. A method for mixing liquids, comprising:
 a) providing a chamber, at least partially fabricated from a dielectric material, and having separate capillary inlets;
 b) flowing liquids to be mixed into the chamber through each capillary inlet, wherein the liquids are flowing in a creeping flow regime;
 c) applying a voltage between pairs of spaced electrodes disposed on the dielectric material of the chamber, wherein each pair of spaced electrodes is in contact with one liquid, thereby subjecting each liquid to a substantially tangential electric field and electroosmotic flow to cause the different liquids to mix together; and
 d) causing the mixed liquid to exit from the chamber.

2. The method of claim 1, wherein said step of applying includes applying a voltage that varies in time.

3. An apparatus for mixing liquids, comprising:
 a) a chamber, at least partially fabricated from a dielectric material, and having separate capillary inlets for flowing liquids into said chamber, wherein the liquids flowing into said chamber flow in a creeping flow regime;
 b) pairs of spaced electrodes disposed on the dielectric material, wherein each pair of spaced electrodes is arranged to be in contact with each liquid;
 c) means for supplying DC power to each pair of electrodes; and
 d) a liquid outlet to direct the outflow from said chamber.

4. The apparatus of claim 3, wherein the chamber is made from a dielectric material having a conductivity less than that of the introduced liquids.

5. The apparatus of claim 4, wherein the dielectric material is selected from the group consisting of silica and alumina.

6. The apparatus of claim 4, further including two or more chambers connected in series.

7. The apparatus of claim 4, further including two or more chambers connected in parallel.

* * * * *